United States Patent [19]
Fenn et al.

[11] Patent Number: 6,079,440
[45] Date of Patent: Jun. 27, 2000

[54] REVERSING VALVE WITH A CROSS SECTION WHICH IS DEPENDENT ON THE DIRECTION OF FLOW

[75] Inventors: Gerald Fenn, Pfersdorf; Hassan Asadi, Schweinfurt; Hans Luksch, Kirchlauter, all of Germany

[73] Assignee: Mannesman Sachs AG, Schweinfurt, Germany

[21] Appl. No.: 09/201,508

[22] Filed: Nov. 30, 1998

[30] Foreign Application Priority Data

Nov. 28, 1997 [DE] Germany .......................... 197 52 670

[51] Int. Cl.[7] .................................................. F16K 17/18
[52] U.S. Cl. .................................. 137/493.9; 137/599.18; 188/282.6; 188/322.15
[58] Field of Search .............................. 188/282.1, 282.5, 188/282.6, 322.15; 137/493.9, 599.2

[56] References Cited

U.S. PATENT DOCUMENTS

| | | | |
|---|---|---|---|
| 4,834,222 | 5/1989 | Kato et al. .......................... | 188/322.15 |
| 4,895,229 | 1/1990 | Kato .................................. | 188/322.15 |
| 5,316,113 | 5/1994 | Yamaoka ........................... | 188/322.15 |

*Primary Examiner*—Stephen M. Hepperle
*Attorney, Agent, or Firm*—Cohen, Pontani, Lieberman & Pavane

[57] ABSTRACT

A reversing valve having a valve body which separates two working spaces which are filled with a fluid. Passage openings are arranged in the valve body and are covered at least partially by a number of valve plates. The cross sectional passage of the passage openings is controlled by a reversing plate as a function of the direction of flow. The reversing plate has spring sections which extend in the circumferential direction and at least one cover surface. The at least one cover surface is aligned with at least one passage opening. The spring sections of the reversing plate are supported on a securing plate.

19 Claims, 7 Drawing Sheets

REVERSING VALVE WITH A CROSS SECTION WHICH IS DEPENDENT ON THE DIRECTION OF FLOW

BACKGROUND OF THE INVENTION

1. Field of the Invention

The invention relates to a reversing valve.

2. Discussion of the Prior Art

German reference DE 40 25 115 A1 describes a damping valve comprising a damping valve body having elevated damping valve body regions formed to emerge from a damping valve base body and to form valve bearing surfaces having passage ducts which are covered by valve plates. At least one annular valve plate is arranged on the valve bearing surfaces and has at least one pre-opening cross section which is congruent with a passage duct. The pre-opening cross section is covered by a return plate which, when subjected to a flow from the passage duct, can lift off from the valve plate in the axial direction of the valve body. This theoretically good design of a direction-dependent pre-opening cross section has, however, the disadvantage that if the return plate is suddenly subjected to a flow a lifting-off movement is carried out which is so rapid that it brings the return plate to bear against the valve plate which is arranged above. The problem arises of how to counteract sticking of the return plate at the aforesaid valve plate without possible spring forces excessively influencing the opening characteristics of the return plate. The sticking effect cannot occur in the embodiment variant according to FIG. 1 of the same document, but the deformation forces which are necessary to allow the return plate to lift off are clearly discernible.

SUMMARY OF THE INVENTION

The object of the present invention is to provide a reversing valve with a throttle cross section which is effective as a function of the direction, so that the switching movement of the valve elements which clear the throttle cross section can proceed with forces which are as small as possible, and secure closing is ensured for the other direction of pressure.

According to the invention, the object is achieved in that the reversing plate has spring sections which extend in the circumferential direction, and at least one cover surface. The at least one cover surface is aligned with at least one passage opening, and the spring sections of the reversing plate are supported on a securing plate. In a reversing plate which has spring sections which extend, for example, in a star shape, the length of the spring sections is determined by the physical space which is available in the radial direction. Spring sections which extend in the circumferential direction make significantly longer spring sections possible, a relatively large length acting inverse proportionally to the spring constant of the spring sections so that the spring constant can be significantly reduced.

In a further embodiment, the reversing plate has at least one spiral-shaped recess. The circumferential section of the reversing plate, which section is bounded by the starting point and end point of the spiral-shaped recess, bounds the spring sections. The length of the spring sections can thus be additionally increased.

Furthermore, in another embodiment of the invention, the reversing plate has two spiral-shaped recesses, the end point of the first spiral-shaped recess being positioned on a larger pitch circle than the starting point of the second spiral-shaped recess. The cover surface then lies usefully in a circular section between the spiral-shaped recesses.

In order to be able to obtain a continuous cover surface which is as large as possible, the spring sections which extend in the circumferential direction are joined in an angular section of the reversing plate.

Further features may also be used in the spatial configuration, for example the spring sections of the reversing plate may be located in the same plane position as the cover surface or be implemented as leaf springs bent out of the plane of the cover surface.

So that the reversing plate always seals to an optimum degree in its closed position, the reversing plate has clamping surfaces which prestress the reversing plate, outside the cover surfaces and the spring elements, against the reversing valve. If the clamping surfaces are positioned radially outside and inside the spring sections, the reversing plate can be clamped-in firmly against the external diameter and against the internal diameter. Slight deformities in terms of the plane position owing to fabrication can be compensated for.

So that the expenditure on mounting is as low as possible, the reversing plate forms a positively locking connection to the valve body in order to achieve an oriented installation position. Thus, it is not necessary to devote any expenditure to checking that the cover surface has always been mounted at the envisaged position.

One can well imagine the reversing plate forming, together with a passage opening, the throttle cross section which is dependent on direction, by virtue of the fact that, for example, a recess is mounted in congruence with a passage opening. However, tolerance fluctuations in terms of the size of the overlap are conceivable so that it is particularly advantageous if the reversing plate bears on a throttle plate, the throttle plate having at least one throttle cross section which can be covered by the at least one cover surface of the reversing plate.

According to a further advantageous embodiment, the securing plate has a channel, at least in the circumferential region of the cover surface of the reversing plate, so that a free space is available for the lifting-off movement of the reversing plate. Here, the securing plate has at least one flow connection in the channel, the flow connection being positioned in the base of the channel. The base of the channel constitutes a travel limitation for the reversing plate. A further advantage for the arrangement of the flow connection in the base of the channel is that the direction in which there is a flow of the damping medium in the closing direction of the reversing plate is perpendicular to the reversing plate and thus the reversing plate is reliably prevented from remaining in the opened position when it is not desired.

Thus, the securing plate is pressed onto the valve body by at least one spring element, the flow connection being made in the base of the channel radially outside the spring element which acts on the securing plate. Therefore, the fluid which is exchanged between the working spaces does not need to flow through the spring element.

In order to ensure, on the one hand, a reliable securing function and, on the other hand, a favorable guidance of the flow in the reversing valve, the securing plate has a radial guide on its internal diameter.

So that all the plates which are used assume the optimum position within the reversing valve, the securing plate, the reversing plate and the throttle plate, which may be used, undergo a positively locking connection to the valve body.

Here, the securing plate has, oriented in the direction of the valve body, positively locking segments which penetrate the reversing plate and the throttle plate and produce the positively locking connection to the valve body which has a counterprofile which is matched to the positively locking segments. It is easier to make a counterprofile in the valve body, or impress it in a punched valve body, than to allow a counterprofile to protrude, since otherwise a thickened valve body blank would have to be used.

So that the plates which were used can only assume a single possible installation position in the circumferential direction, the individual profiles of the individual plates which are used in the positively locking connection have a difference in profiling in the circumferential direction.

So that the plates also come to bear one on the other with the envisaged sides, the throttle cross sections are oriented symmetrically to the positively locking profile part with the difference in profiling.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 6b is a section along line VIb—VIb of FIG. 6a;

FIG. 7b is a section along line VIIb—VIIb of FIG. 7a.

DETAILED DESCRIPTION OF THE PREFERRED EMBODIMENT

Figure 1:
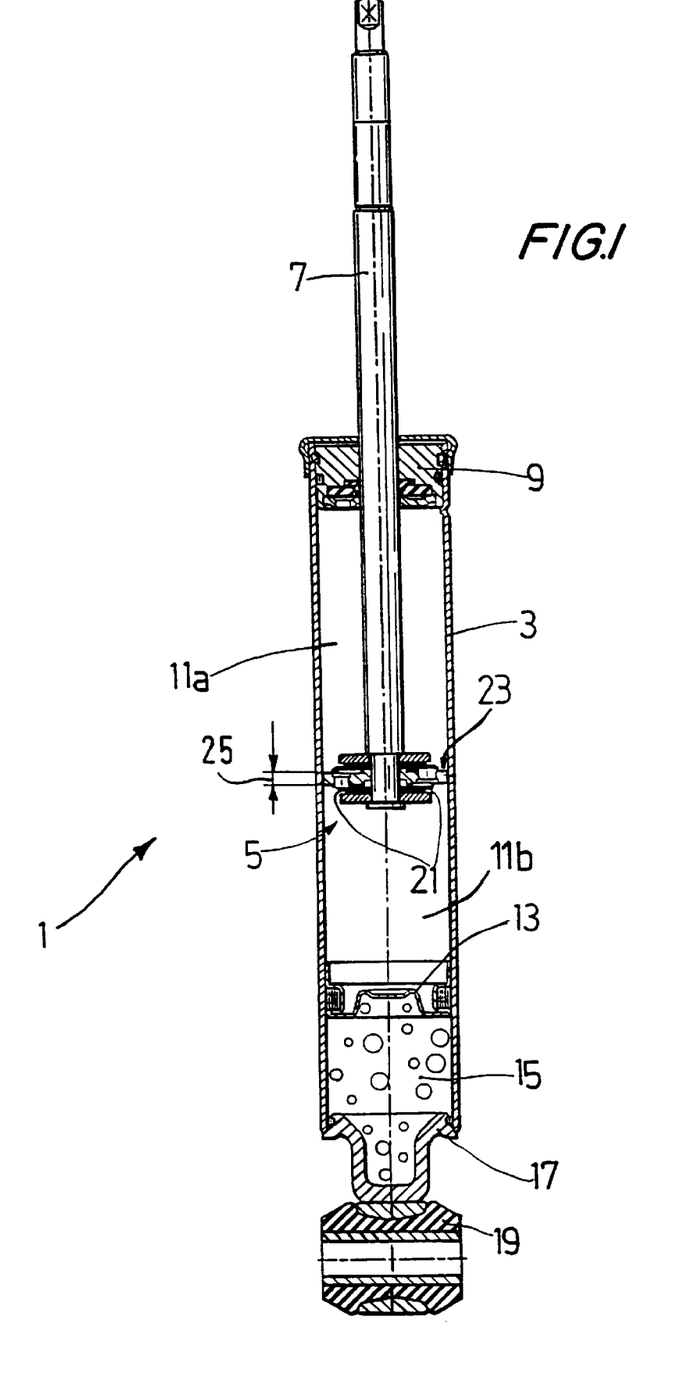
FIG. 1 shows an exemplary embodiment of a vibration damper.

FIG. 1 shows, by way of an example, a piston cylinder assembly 1 embodied as a single-tube vibration damper. Basically, the invention can also be used in other piston cylinder assemblies such as pneumatic springs or the like.

The single-tube vibration damper 1 is composed essentially of a pressure tube 3 with a piston 5 arranged in an axially movable fashion on a piston rod 7. On the outlet side of the piston rod 7, a piston rod guide 9 closes off a working space 11a, 11b which is filled with the damping agent and which is separated by a separating piston 13 from a gas space 15 which has a base 17 with an eyelet 19 at the end.

When the piston rod 7 moves, damping medium is forced through damping valves 21 in the piston 5. A piston ring 23, which covers a circumferential surface 25 of the piston 5, prevents a lateral flow around the piston.

Figure 2:
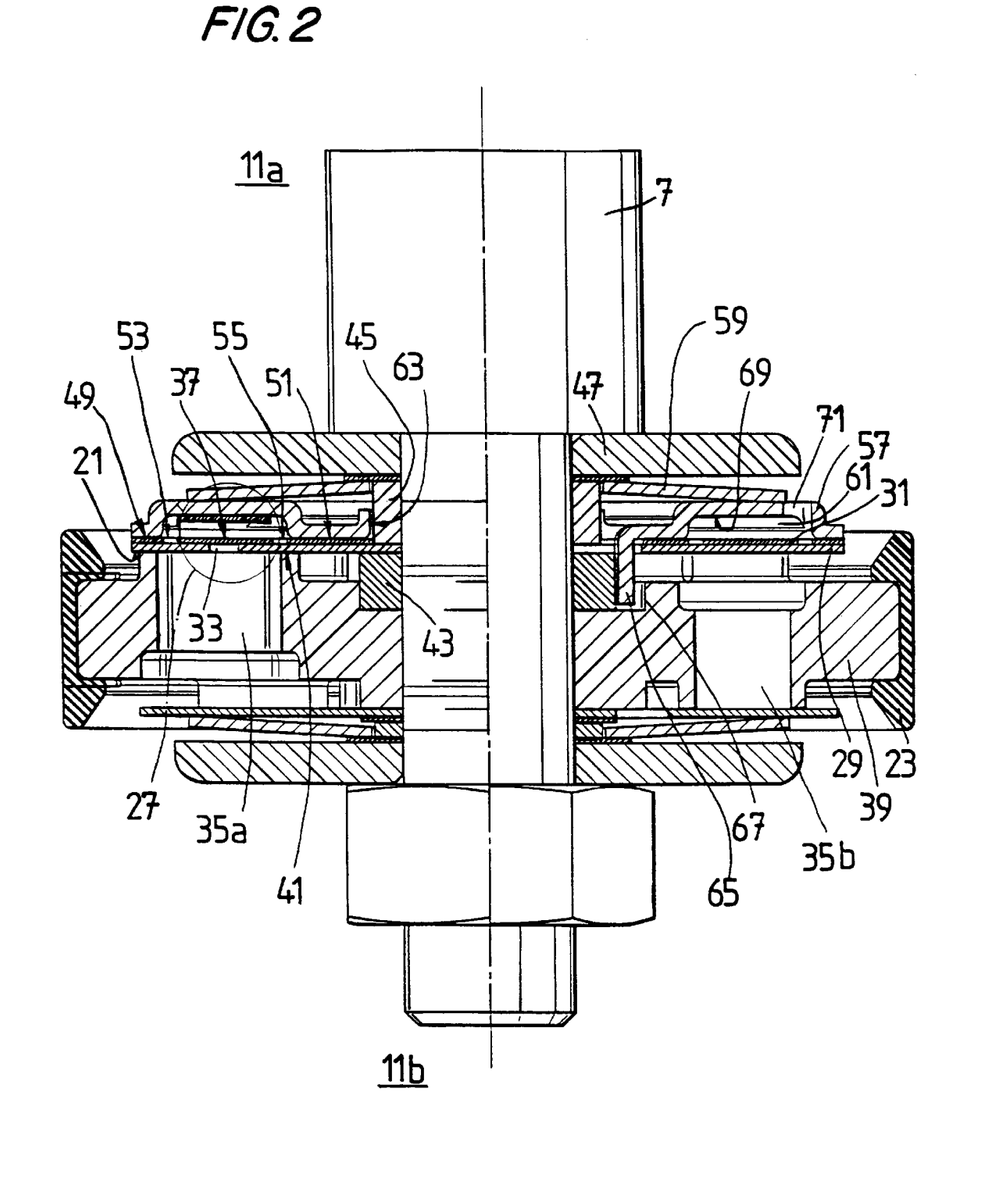
FIG. 2 shows a valve body pursuant to the present invention in detail.

FIG. 2 shows the piston 5 of the vibration damper 1 as an individual part with a reversing valve 27 according to the invention, which is composed in this embodiment of a throttle plate 29 in conjunction with a reversing plate 31. In the throttle plate 29 there is at least one throttle cross section 33 oriented to a passage opening 35a, 35b, the throttle cross section 33 or cross sections being covered by a cover surface 37 of the reversing plate 31. Basically, the invention can also be transferred to a base valve of a vibration damper or to another application.

The reversing valve 27 is part of the damping valve 21 in the piston 5 of the vibration damper 1 which has a valve body 39 which connects the two working spaces 11a and 11b via the passage openings 35a, 35b. The passage openings 35a, 35b open out of valve bearing surfaces 41 on which the throttle plate 29 bears in its external region. At the radially internal region, a bearing ring 43 is introduced or pressed into the valve body 39, and its bearing surface lies exactly in one plane with the valve bearing surface 41, so that the throttle plate 29 is planar over its entire surface. The centering of the throttle plate 29 is carried out by means of the internal diameter on a journal of the piston rod 7. If appropriate, the bearing ring 43 is worked together with the valve bearing surfaces 41 in a common operation at the envisaged height. The throttle plate 29 can deform elastically, the external region which bears on the valve bearing surfaces being able to lift off, whereas the internal region is secured to the piston rod journal by means of a clamping ring 45 in conjunction with a stop plate 47.

The reversing plate 31 which bears on the throttle plate 29 has internal and external clamping surfaces 49, 51 radially inside and outside the cover surface 37. The clamping surfaces 49, 51 are each separated by recesses 53, 55, as a result of which the cover surface 37 can lift off from the valve bearing surface in the axial direction of the valve body 39. To center the reversing plate 31, use is made of its internal diameter which also acts on the clamping ring 45.

So that the lifting-off movement of the cover surface 37 of the reversing plate 31 is bounded, a securing plate 57 is laid on the clamping surfaces 49, 51. The securing plate 57 is in turn prestressed by a spring element 59, in this case a disk spring. At least in the vicinity of the cover surface 37 of the reversing plate 31, the securing plate 57 has a channel 61 which makes available the necessary free space for the lifting-off movement of the cover surface 37 (see left-hand half of section). Guide segments 63 are formed as a radial guide on the internal diameter of the securing plate 57 in the direction of the stop plate 47. Positively locking segments 65, which engage through the reversing plate 31 and the throttle plate 29 and in a counterprofile 67 of the valve body 39 which is matched to the connection segments are made in the other direction.

Flow connections 71, which connect the channel 61 to the upper working space 11a, are made in the base 69 of the channel 61. The flow connections 71 lie outside the surface of the spring element 59.

When there is a flow of damping agent out of the working space 11b through the passage openings 35a and against the reversing valve 27, the throttle plate 29 is subjected to pressure over the cross section of the passage openings 35a, 35b. Low pressure forces cannot lift off the throttle plate 29 from the valve bearing surfaces counter to the force of the spring element 59. In these cases, only the cover surface 37 of the reversing plate 31 which is loaded on the cross section of the pre-openings 33 is lifted off from the throttle plate 29 so that damping agent can flow into the channel 61 and on into the working space 11a through the flow connections 71.

If larger pressure forces occur, the throttle plate 29 lifts off in the vicinity of the bearing surfaces, as a result of which the damping valve 21 is active. The reversing plate 31 and the securing plate 57 are also lifted off. When the direction of flow is reversed, the cover surface 37 is pressed onto the throttle plate 29 by the pressure in the channel 61, so that the damping medium can only flow into the working space 11b through the passage openings 35b.

Figure 3:
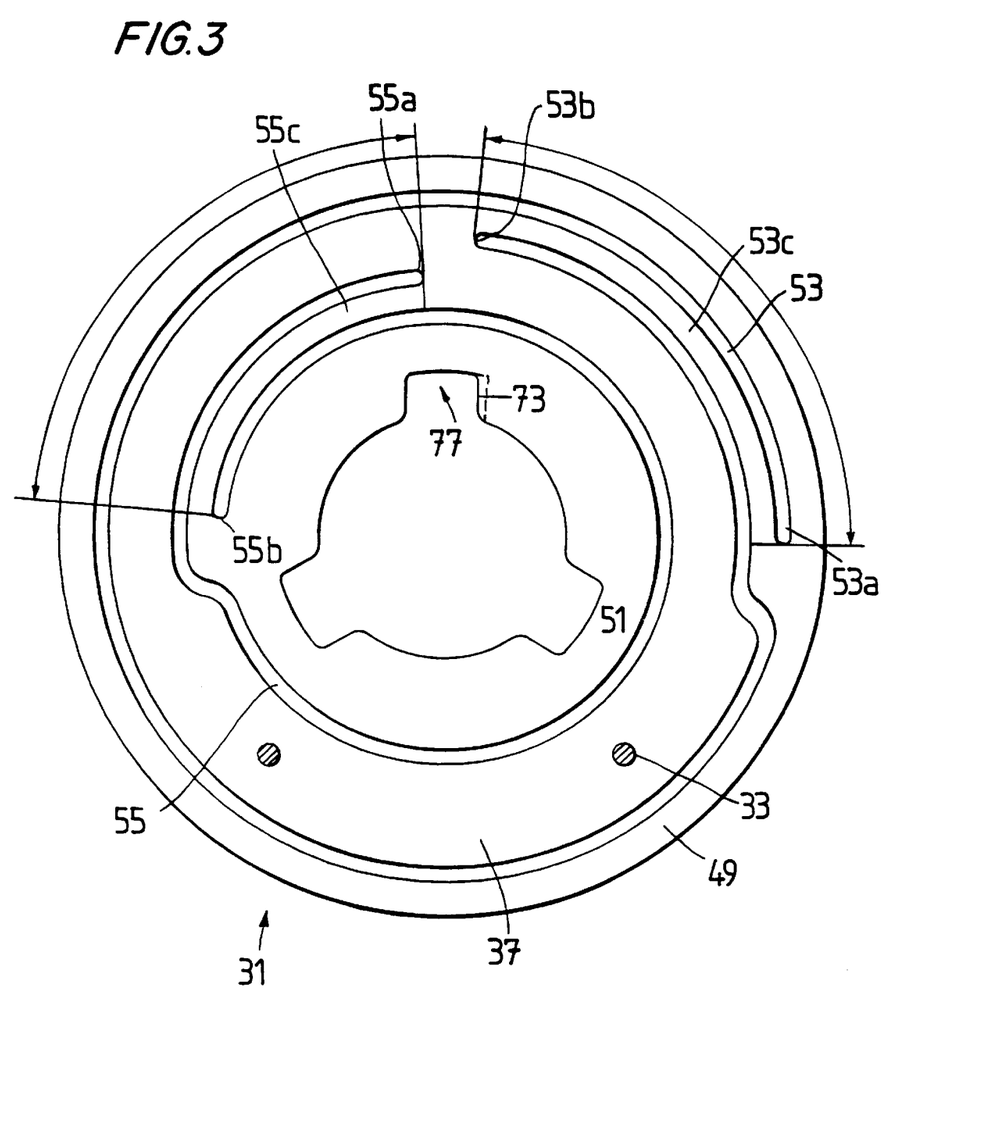
FIG. 3 shows a reversing plate as an individual part.

FIG. 3 illustrates the reversing plate 31 as an individual part. The reversing plate 31 has the first external recess 53 which is implemented in a spiral shape over an angle of approximately 450°. Between its starting point 53a and its end point 53b, the spiral-shaped recess 53 forms a spring section 53c which extends in the circumferential direction and lies in the same plane position as the other surface parts of the reversing plate 31. The greater the distance between the starting point 53a and end point 53b in the circumferential direction, the longer the spring section 53c, and thus the smaller the spring constant of the spring section 53c. The recess 55 which lies further toward the inside in the radial direction is also spiral shaped and its circumferential angle is of a comparable or identical magnitude to the external recess 53. An internal spring section 55c which extends in the circumferential direction is in turn formed between a starting point 55a and an end point 55b of the internal spiral-shaped recess 55. If the external and internal clamping surfaces 49, 51, which each lie outside the spiral-shaped recesses 53, 55, are imagined to be stationary with respect to the cover surface 37, the cover surface 37 can lift off from the plane position, the spring sections 53c, 55c deforming like leaf springs. As a result of the spring sections 53c, 55c, a degree of prestress, if only low, of the cover surface 33 with respect to the throttle plate 29 is ensured so that the cover surface 37 is always moved back in the direction of the throttle plate 29 and there is a defined closing characteristic.

The starting and end points of the spiral-shaped recesses 53, 55 are combined in one half of the reversing plate 31 so that a cover surface 37 which is as large as possible can be produced. The throttle cross sections 33 in the cover surface are shown for the sake of better comprehension.

Figure 4:
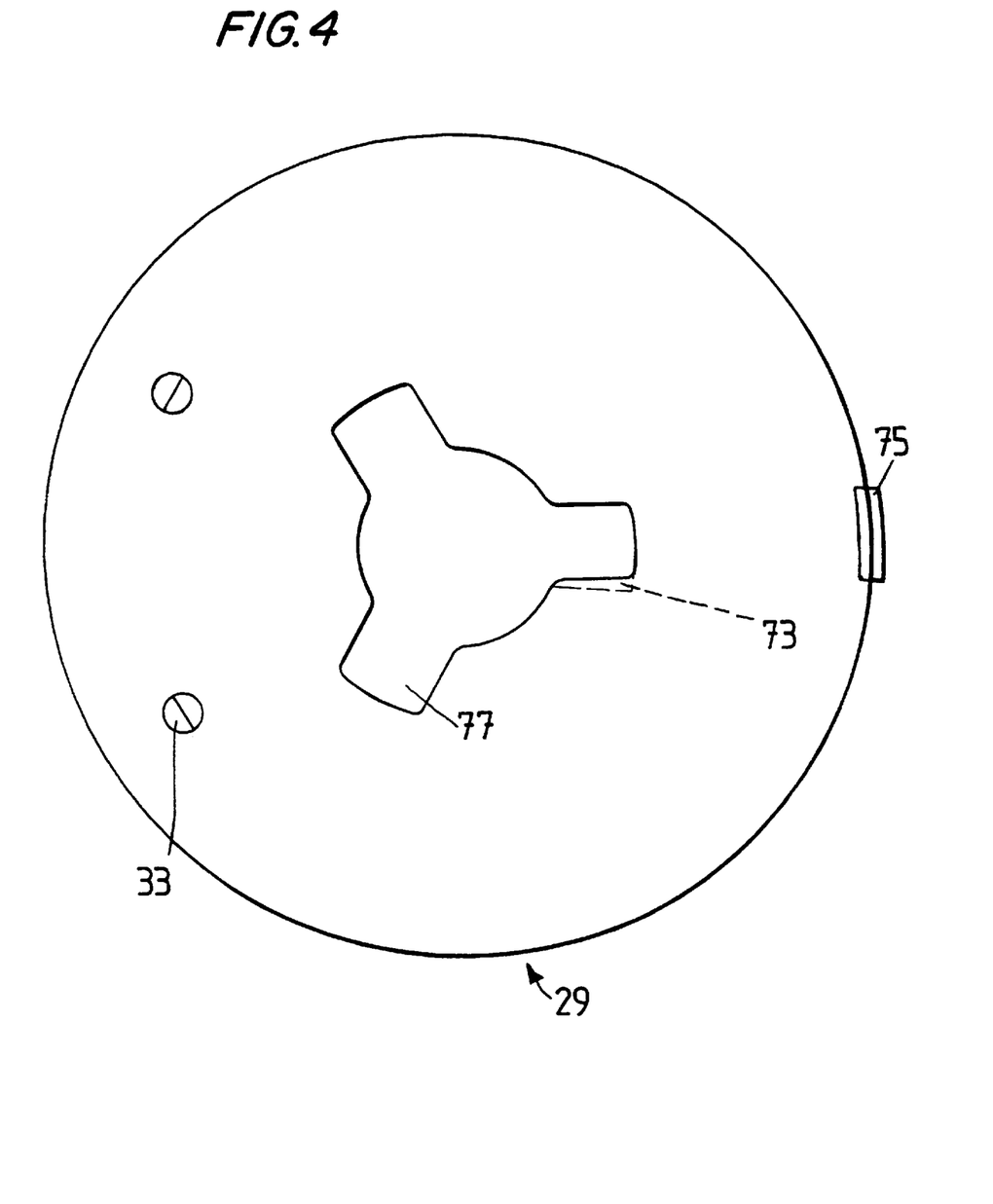
FIG. 4 shows a throttle plate as an individual part.

FIG. 4 shows the throttle plate 29 as an integral part with its two throttle cross sections 33. So that the throttle plate 29 is aligned with the throttle openings in the valve body 39, the internal diameter is of profiled design, a difference in profiling 73 being used. Moreover, the reversing plate 31 is profiled in a way identical to the throttle plate 29. The profiling is of groove-like design, the throttle cross section 33 in the throttle plate 29 being aligned symmetrically with the profile part with the difference in profiling 73 in order to prevent the throttle cross sections being installed in the valve body in an incorrect position with respect to the passage openings 35a, 35b.

Figure 5:
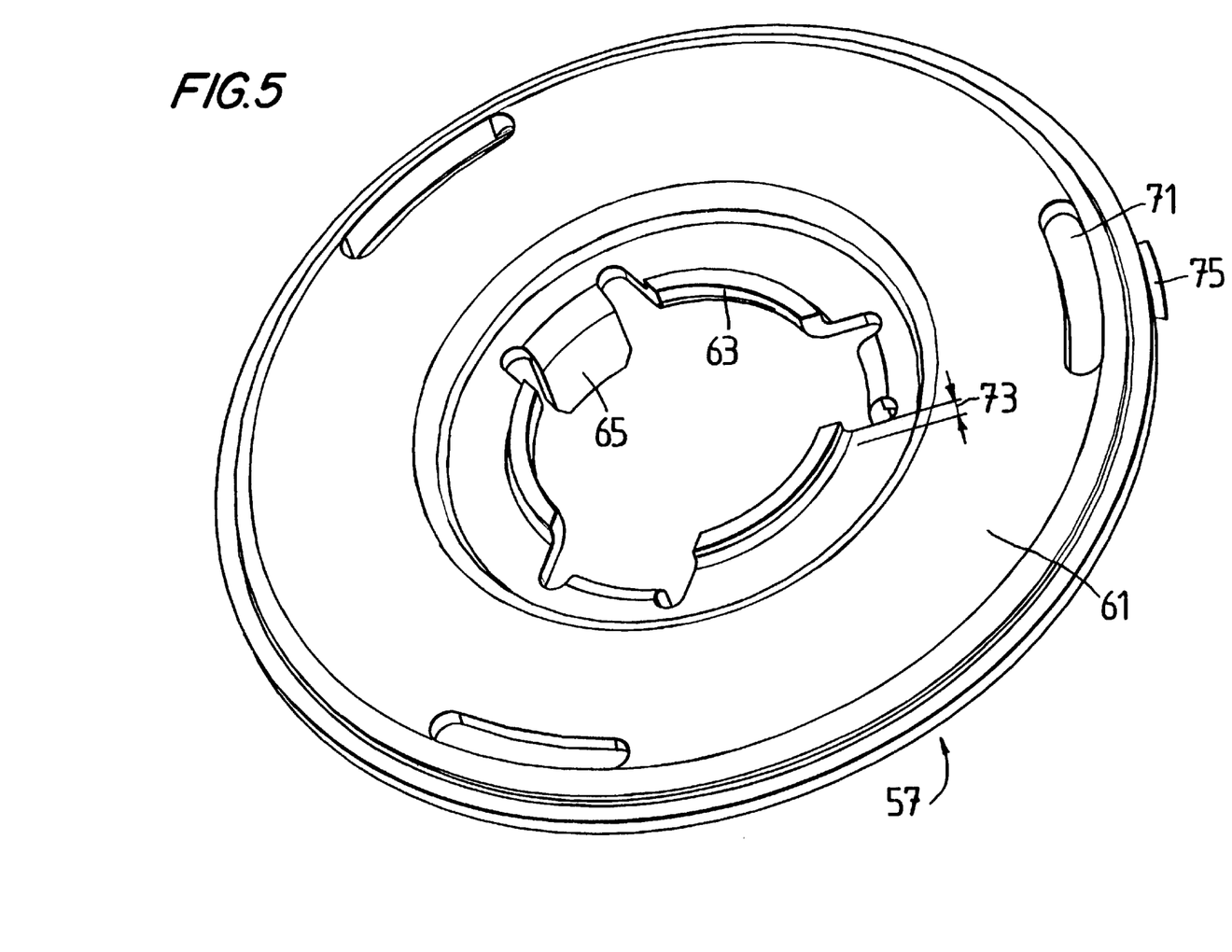
FIG. 5 shows a securing plate as an individual part.

FIG. 5 provides supplementary information on FIG. 2 and thus shows the securing plate 57, the positively locking segments 65 which engage through the reversing plate 31 and the throttle plate 29 being represented more clearly in this view. The difference in profiling 73 which has already been mentioned is also present on the positively locking segments 65. Furthermore, it is apparent that the flow connections 71 are slits made in the circumferential direction. The channel 61 is formed all around the circumference.

So that during the assembly operation the threading in of the securing plate 57 of the reversing plate 31 and of the throttle plate 29 is made easier, these plates may have notches 75 or similar markings which make it possible to detect the predetermined installation position.

Figure 6A:
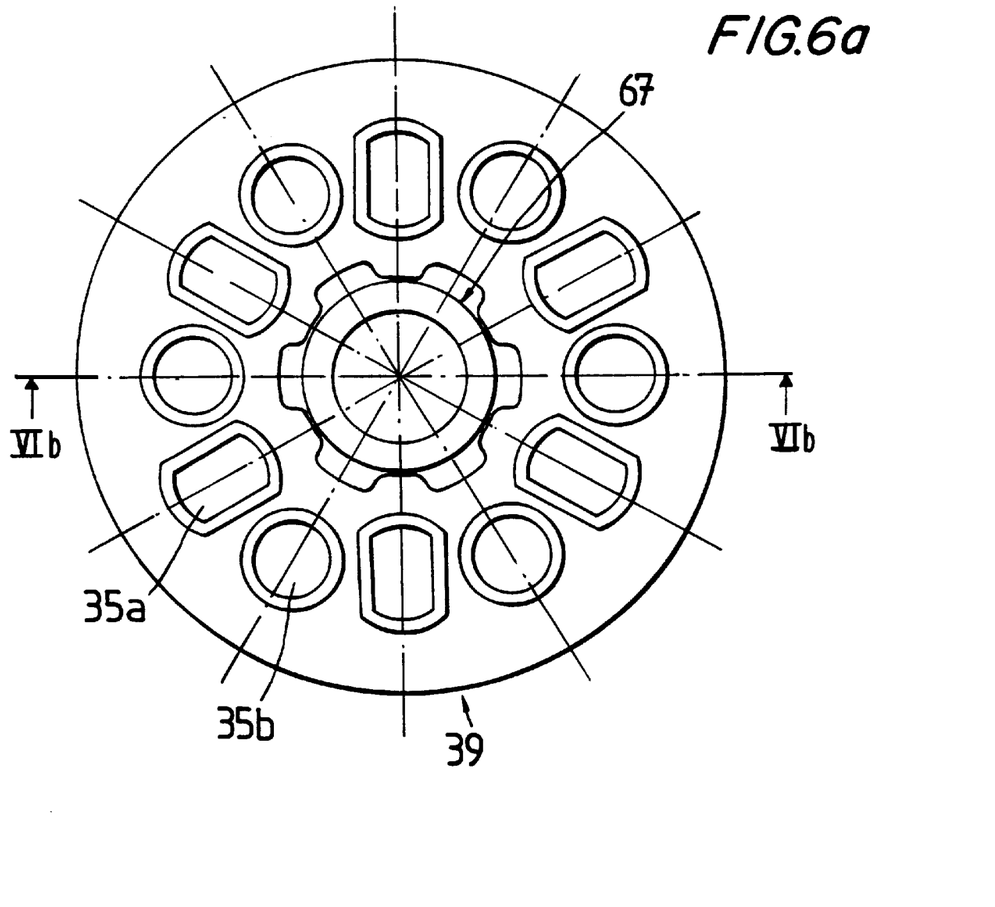
FIG. 6a shows an alternative embodiment of a reversing plate.
Figure 6B:
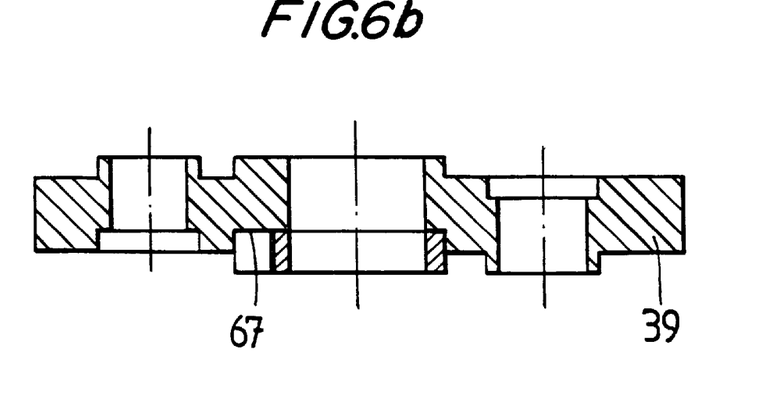

FIG. 6 shows the counterprofile 67 which undergoes a positively locking connection with the positively locking segments 65 of the securing plate 57 and orientates the entire disk arrangement.

In the case of relatively small passage openings 35a, 35b, it is possible, under certain circumstances, to dispense with a throttle plate if the internal or external recess of the reversing plate is located in the vicinity of the valve bearing surface. With its sickle-shaped overlap with the passage opening 35, the respective other recess then forms the throttle cross section 33, it being necessary to ensure that the reversing plate is not so elastic that when there is a flow from the direction of the working space 11a it is pressed into the passage opening by the pressure of the flow.

Figure 7A:
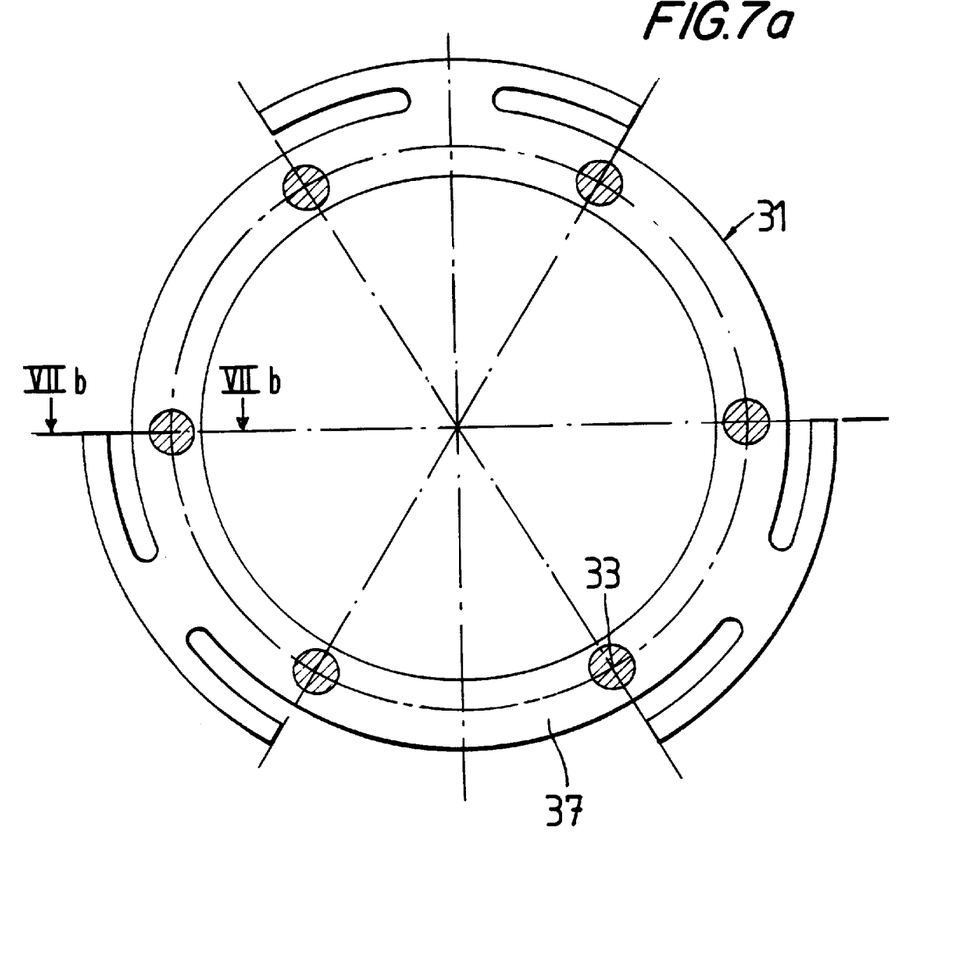
FIG. 7a shows another embodiment of a reversing plate.
Figure 7B:
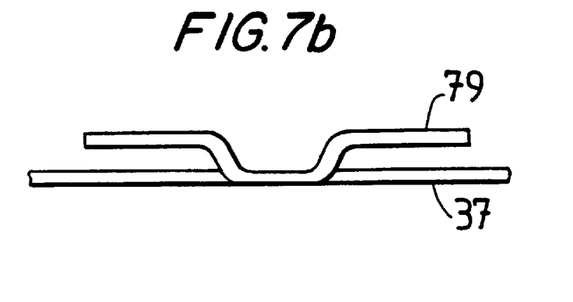

For reversing valves which have a particularly small diameter, there is provision to use a reversing plate according to FIG. 7. There are also spring sections 79 which extend in the circumferential direction but which are bent with respect to the cover surface 37 and act on the base 69 of the channel of the securing plate 57. With this reversing plate it is possible to dispense with the measures for centering the reversing plate. In this embodiment, three pairs of spring sections 77 are formed in order to prevent the reversing plate being placed in a skewed position within the channel of the securing plate.

The invention is not limited by the embodiments described above which are presented as examples only but can be modified in various ways within the scope of protection defined by the appended patent claims.

We claim:

1. A reversing valve, comprising:
   a valve body which separates two fluid containing working spaces, the valve body having passage openings;
   a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening; and
   a securing plate arranged to support the spring sections of the reversing plate, the reversing plate having a spiral-shaped recess with a start point and an end point which bound a circumferential section of the reversing plate which bounds a spring section.

2. A reversing valve as defined in claim 1, wherein the reversing plate has two spiral-shaped recesses, the end point of a first of the spiral-shaped recesses being positioned on a larger pitch circle than the start point of a second of the spiral-shaped recesses.

3. A reversing valve as defined in claim 1, wherein the spring sections of the reversing plate are located in a common planar position with the cover surface.

4. A reversing valve as defined in claim 1, wherein the reversing plate has clamping surfaces which prestress the reversing plate outside the cover surface against the valve body.

5. A reversing valve as defined in claim 1, and further comprising a throttle plate arranged so that the reversing plate bears on the throttle plate, the throttle plate having at least one throttle cross section which can be covered by the at least one cover surface of the reversing plate.

6. A reversing valve as defined in claim 1, wherein the securing plate has a channel at least in a circumferential region of the cover surface of the reversing plate so that a free space is available for a lifting-off movement of the reversing plate.

7. A reversing valve as defined in claim 6, wherein the securing plate has at least one flow connection in the channel, the flow connection being positioned in a base of the channel.

8. A reversing valve as defined in claim 7, and further comprising a spring element arranged so as to press the securing plate onto the valve body, the flow connection being in the base of the channel radially outside the spring element which acts on the securing plate.

9. A reversing valve as defined in claim 5, wherein the securing plate, the reversing plate and the throttle plate are connected to the valve body by a positively locking connection.

10. A reversing valve, comprising:
a valve body which separates two fluid containing working spaces, the valve body having passage openings;
a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening; and
a securing plate arranged to support the spring sections of the reversing plate, the spring sections being leaf springs bent out of a plane of the cover surface.

11. A reversing valve, comprising:
a valve body which separates two fluid containing working spaces, the valve body having passage openings;
a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening; and
a securing plate arranged to support the spring sections of the reversing plate, the reversing plate being configured to form a positively locking connection with the valve body so as to achieve an oriented installation position.

12. A reversing valve, comprising:
a valve body which separates two fluid containing working spaces, the valve body having passage openings;
a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening; and
a securing plate arranged to support the spring sections of the reversing plate, the securing plate having a radial guide on its internal diameter.

13. A reversing valve, comprising:
a valve body which separates two fluid containing working spaces, the valve body having passage openings;
a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening; and
a securing plate arranged to support the spring sections of the reversing plate, the securing plate and the reversing plate being connected to the valve body by a positively locking connection.

14. A reversing valve as defined in claim 13, wherein the securing plate has positively locking segments oriented in a direction of the valve body so as to penetrate the reversing plate and engage in a counterprofile in the valve body so as to produce the positively locking connection to the valve body.

15. A reversing valve as defined in claim 13, wherein individual profiles of individual of the plates which are used in the positively locking connection are configured to have a difference in profiling so that only a single installation position is possible within the positively locking connection.

16. A reversing valve, comprising:
a valve body which separates two fluid containing working spaces, the valve body having passage openings;
a number of valve plates arranged so as to at least partially cover the passage openings in the valve body, the valve plates including a reversing plate operative to control a cross-sectional passage of the passage openings as a function of flow direction, the reversing plate having spring sections which extend in a circumferential direction and at least one cover surface, the at least one cover surface being aligned with at least one passage opening;
a securing plate arranged to support the spring sections of the reversing plate; and
a throttle plate arranged so that the reversing plate bears on the throttle plate, the throttle plate having at least one throttle cross-section which can be covered by the at least one cover surface of the reversing plate, the securing plate, the reversing plate and the throttle plate being connected to the valve body by a positively locking connection.

17. A reversing valve as defined in claim 16, wherein the securing plate has positively locking segments oriented in a direction of the valve body so as to penetrate the reversing plate and the throttle plate, and engage in a counterprofile in the valve body so as to produce the positively locking connection to the valve body.

18. A reversing valve as defined in claim 16, wherein individual profiles of individual of the plates which are used in the positively locking connection are configured to have a difference in profiling so that only a single installation position is possible within the positively locking connection.

19. A reversing valve as defined in claim 18, wherein the throttle cross sections are oriented symmetrically to the positively locking profile part with the difference in profiling.

* * * * *